United States Patent
Caporizzo (10) Patent No.: US 9,851,434 B2
(45) Date of Patent: Dec. 26, 2017

(54) METHOD AND NAVIGATION SYSTEM FOR ASSISTING A VISUALLY IMPAIRED USER TO SAFELY WALK AROUND OBSTRUCTIONS AND IMPEDIMENTS

(71) Applicant: Louis Caporizzo, North Wales, PA (US)

(72) Inventor: Louis Caporizzo, North Wales, PA (US)

( * ) Notice: Subject to any disclaimer, the term of this patent is extended or adjusted under 35 U.S.C. 154(b) by 905 days.

(21) Appl. No.: 14/270,632

(22) Filed: May 6, 2014

(65) Prior Publication Data

US 2015/0323325 A1 Nov. 12, 2015

(51) Int. Cl.
| | |
|---|---|
| *G01S 1/00* | (2006.01) |
| *G01S 7/497* | (2006.01) |
| *G01C 21/20* | (2006.01) |
| *G09B 21/00* | (2006.01) |
| *G01S 17/02* | (2006.01) |
| *G01S 17/10* | (2006.01) |
| *G01S 17/42* | (2006.01) |
| *G01S 17/87* | (2006.01) |
| *G01S 17/89* | (2006.01) |
| *G01S 17/93* | (2006.01) |
| *A61H 3/06* | (2006.01) |

(52) U.S. Cl.
CPC .............. *G01S 7/497* (2013.01); *A61H 3/061* (2013.01); *G01C 21/20* (2013.01); *G01S 17/023* (2013.01); *G01S 17/10* (2013.01); *G01S 17/42* (2013.01); *G01S 17/87* (2013.01); *G01S 17/89* (2013.01); *G01S 17/93* (2013.01); *G09B 21/00* (2013.01); *G09B 21/001* (2013.01); *A61H 2003/063* (2013.01); *A61H 2201/164* (2013.01); *A61H 2201/1604* (2013.01); *A61H 2201/165* (2013.01); *A61H 2201/1619* (2013.01); *A61H 2201/5007* (2013.01); *A61H 2201/5043* (2013.01); *A61H 2201/5058* (2013.01); *A61H 2201/5069* (2013.01); *A61H 2201/5097* (2013.01)

(58) Field of Classification Search
CPC ........ G01S 17/93; G09B 21/001; A61H 3/061
USPC ........................................................ 701/400
See application file for complete search history.

(56) References Cited

U.S. PATENT DOCUMENTS 3,654,477 A * 4/1972 Benjamin, Jr. ........... A61F 9/08
250/221
6,198,395 B1 * 3/2001 Sussman ................... A61F 9/08
340/407.1

(Continued)

*Primary Examiner* — Mark Hellner
(74) *Attorney, Agent, or Firm* — Volpe and Koenig, P.C.

(57) ABSTRACT

A computer-implemented method and a navigation system are described for guiding a visually impaired user to avoid obstructions and impediments while walking. The user may wear a plurality of subassemblies of the system. The tilt and rotation of the user's head may be monitored using one of the subassemblies worn on the user's head. Based at least in part on the tilt and rotation of the user's head, vertical and horizontal firing angles used by a distance measuring unit in each of the subassemblies may be calculated to transmit and receive laser signals to perform measurements. The user is then provided with navigation instructions and alarms based on whether an obstruction or an impediment is detected that is closer than a predetermined distance to the user while the user is walking based on the measurements.

19 Claims, 4 Drawing Sheets

(56) References Cited

U.S. PATENT DOCUMENTS

| | | | | |
|---|---|---|---|---|
| 7,620,493 | B2* | 11/2009 | Stankiewicz | G01C 21/20 340/539.13 |
| 7,855,657 | B2* | 12/2010 | Doemens | A61H 3/061 340/4.11 |
| 8,068,644 | B2* | 11/2011 | Tkacik | G09B 21/006 382/114 |
| 9,162,061 | B2* | 10/2015 | Barnes | A61N 1/36046 |
| 9,488,833 | B2* | 11/2016 | Cervantes | H04N 13/0239 |

* cited by examiner

METHOD AND NAVIGATION SYSTEM FOR ASSISTING A VISUALLY IMPAIRED USER TO SAFELY WALK AROUND OBSTRUCTIONS AND IMPEDIMENTS

FIELD OF INVENTION

The present invention is generally directed to using laser signals to navigate around obstructions (e.g., cars, street signs, people, buildings) and impediments (e.g., curbs, stairs, potholes).

BACKGROUND

Losing one's vision can create challenges in everyday life. According to the World Health Organization, 285 million people are estimated to be visually impaired worldwide: 39 million are blind and 246 million have low vision. About 90% of the world's visually impaired people live in developing countries. According to the American Foundation for the Blind, more than 10 million Americans are visually impaired. There are four levels of visual function, according to the International Classification of Diseases, including: 1) normal vision; 2) moderate visual impairment; 3) severe visual impairment; and 4) blindness. Moderate visual impairment combined with severe visual impairment are grouped under the term "low vision", which taken together with blindness represents all visual impairment.

A visually impaired person faces many challenges in everyday life, but most can be overcome with some adaptations. For example, before a visually impaired person walks from his or her residence to a transportation center or a local post office, he or she has to physically survey (utilizing a walking stick) the pavement, and this surveying has to continuously take place before every step. The visually impaired person cannot detect changes in pavement levels until it can be sensed with his or her walking stick. Using a seeing eye dog as a guide is beneficial, but the caring needed by the dog may be an issue and the visually impaired person may have to rely on additional personnel for assistance. While walking, the visually impaired person may not be able to determine what lies inches past the length of the walking stick.

Today's computer technology has benefited the visually impaired in classrooms by utilizing portable note takers, book readers, detection of colors and signs, but there is much more that needs to be done so that the visually impaired may become fully independent outside of a contained and known environment so that they may freely enjoy a walk, thus enhancing their present level of independence.

SUMMARY

A computer-implemented method and a navigation system are described for guiding a visually impaired user to avoid obstructions and impediments while walking. The user may wear a plurality of subassemblies of the system. The tilt and rotation of the user's head may be monitored using one of the subassemblies worn on the user's head. Based at least in part on the tilt and rotation of the user's head, vertical and horizontal firing angles used by a distance measuring unit in each of the subassemblies may be calculated to transmit and receive laser signals to perform measurements. The user is then provided with navigation instructions and alarms based on whether an obstruction or an impediment is detected that is closer than a predetermined distance to the user while the user is walking based on the measurements.

DETAILED DESCRIPTION OF THE PREFERRED EMBODIMENTS

A method and apparatus are described for creating a field of view for the detection of obstacles in the path of a visually impaired user, so as to aid the user walk without being injured. The subassemblies of an obstruction detection system described herein may be secured to various parts of the user's body. As part of an initialization process, the system may confirm that each of the subassemblies of the system has been correctly installed and is operational. The system may be configured to update the field of view while the visually impaired user is moving (i.e., walking), by the user inputting a command using a graphical user interface (GUI) or by providing a voice command using a microphone.

Figure 1:
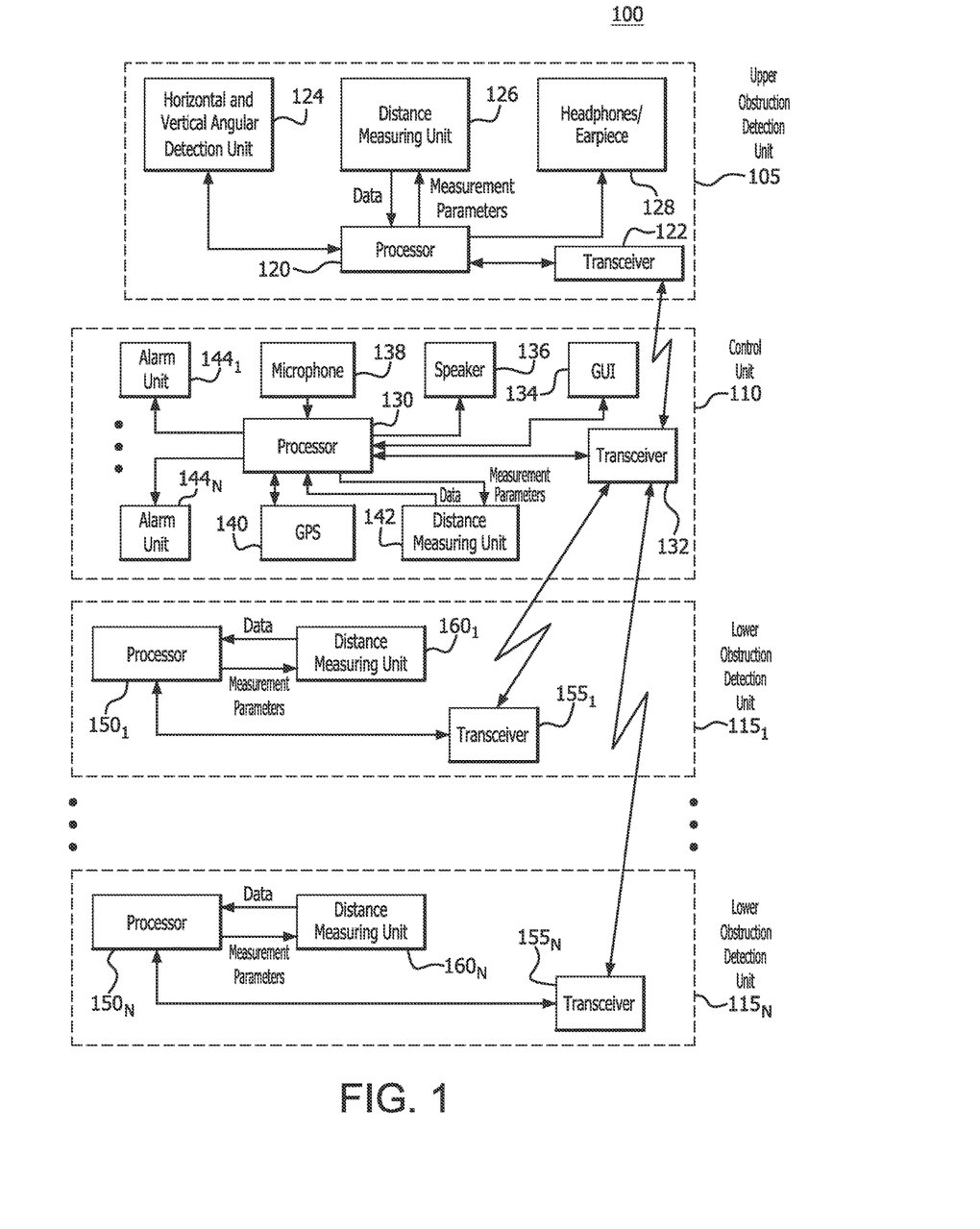
FIG. 1 is a block diagram of an example of a navigation system for a visually impaired user.

FIG. 1 shows a block diagram of an obstruction detection system 100 in accordance with one embodiment. The system 100 may include an upper obstruction detection unit 105, a control unit 110 and a plurality of lower obstruction detection units $115_1$-$115_N$. Each of these subassemblies of system 100 may include a distance measuring unit and may be secured on different parts of a visually impaired user's body so that obstacles may be detected while the user is walking without the user being injured. For example, the upper obstruction detection unit 105 may be positioned on the user's head, the control unit 110 may be positioned on the user's chest, and the lower obstruction detection units 115 may be positioned on the user's legs. Each of the subassemblies may be powered by a combination of one or more batteries, an auxiliary power source, or any other readily available power supply. Note that although only one upper obstruction detection unit 105, one control unit 110 and a plurality of lower obstruction detection units 115 are depicted in FIG. 1, any number of obstruction detection units and control units may be used.

The system 100 may generate an alarm for the user if an object violates a minimum clearance distance in a defined field of view. The field of view may be determined by the user's physical size (e.g., height, length of arms) while the depth of the field may be created by a distance requested by the user that is to be monitored. The control unit 110 may be configured to define the scanned area to be monitored, and to compute and instruct a distance measuring unit in each of the subassemblies of system 100 as to its respective field of view to be monitored. The total field of view may be covered by original coordinates plus guard bands defined for each of the distance measuring units.

Each of the distance measuring units may have an adjustable laser light firing angle for a signal that is utilized for the measuring of distances to objects that may obstruct the user's path while walking. The laser light firing angle starting point may be defined by the control unit 110, but only after it receives inputs from the upper obstruction detection unit 105. The upper obstruction detection unit 105 may provide the starting laser light firing angle in both horizontal and vertical positions, reflecting the coordinates of the user's head position. The upper obstruction detection unit 105 may provide this firing angle starting data to the control unit 110, where it may be analyzed and processed so that it may instruct each distance measuring unit in the subassemblies of system 100 to cover a respective designated field of view for the user. In addition to providing the starting laser light firing angle coordinates, the upper obstruction detection unit 105 may monitor a portion of the field of view. If the user's head position changes during a data gathering cycle, the control unit 110 may wait until all of the data has been processed before moving to new coordinate settings. Once the new coordinates have been determined, the upper obstruction detection unit 105 may determine the size of the field to be monitored and provide the determined field size to the control unit 110. The total field calculations may be repeated every time the user's head changes its position from a previous position.

The distance measuring units may not be in sync with each other. Thus, each distance measuring unit may independently collect and report collected data to the control unit 110 for the specified field of view. The distance measuring units may be capable of adjusting their laser light firing angle when instructed by the control unit 110.

As shown in FIG. 1, the upper obstruction detection unit 105 may include a processor 120, a transceiver 122, a horizontal and vertical angular detection unit 124, a distance measuring unit 126 and a speaker 128. The control unit 110 may include a processor 130, a transceiver 132, a graphical user interface (GUI) 134, (e.g., a keyboard, a mouse, and the like), a speaker 136, a microphone 138, a global positioning system (GPS) 140, a distance measuring unit 142, and a plurality of alarm units 1441-144N, each alarm unit 144 including at least one of a vibration strap, an audible alert device, and the like. Each of the lower detection units 115 may include a processor 150, a transceiver 155 and a distance measuring unit 160.

Electronic based distance measuring devices are readily available. These devices may utilize laser light in order to perform distance measurements. The operation of these devices may be initiated by pointing a laser at an object of interest and a measurement may be displayed on a screen.

The distances between a distance measuring unit and an object may be measured utilizing a "time of flight" technology. Alternatively, a multiple frequency shift technology may be used. When triggered, a laser distance measuring unit may emit a pulse of light and, almost simultaneously, the light may be reflected back to the laser distance measuring unit. The reflected light may be associated with a delay, whereby the distance between point A and B may be defined as follows:

$$D=c \times t/2, \quad \text{Equation (1)}$$

where c is the speed of light (c=300,000,000 meters per second) in the atmosphere, and t is the amount of time for the round-trip between A and B. Laser distance measuring units that are readily available may measure distances up to 200 feet and have an accuracy of plus or minus 1/16 inch.

In accordance with one embodiment, the trigger mechanism and the firing position of the beam (laser) of the distance measuring units may be computer (e.g., processor) controlled to define the firing angle for each of the vertical and horizontal settings. Each of the obstruction detection units 105 and 115 may communicate with the transceiver 132 of the control unit 110 via their respective transceivers 122 and 155, (e.g., via Bluetooth or any other wireless communication technology). As part of the data they transmit, each subassembly may be assigned an identifier so that the control unit 110 may keep track of where the subassembly is located on the visually impaired user's body. In order to determine the field of view of the user, the system 100 may be configured to automatically calculate the height of the user prior to entering an obstruction detection mode, whereby the user begins to walk step by step.

While the user is facing a wall, the distance measuring unit 126 in the upper obstruction detection unit 105 may be instructed by the processor 120 to measure the distance to the wall, utilizing maximum firing angle limits. The collected data by the distance measuring unit 126 may be tabulated, and only the minimum value may be retained and be made available for the processor 120, which subsequently may relay the minimum value to the control unit 110 via transceivers 122 and 132 to be utilized for further calculations. The minimum distance recorded may indicate the point at which the user's head is level. The speaker 128 in the upper obstruction detection unit 105 may be configured to couple fixed or variable audible signals from processor 120 as instructed by the control unit 110, to provide the user with instructions.

The horizontal and vertical angular detection unit 124 of the upper obstruction detection unit 105 may be configured to continuously monitor the user's head position, as instructed by the processor 120, and provide the collected coordinate data to the processor 120, which subsequently may relay the data to the control unit 110 via transceivers 122 and 132, so that calculations of the field of view may be performed.

The distance measuring unit 126 in the upper obstruction detection unit may be configured to scan a field of view as instructed by the processor 120. The processor 120 may instruct the distance measuring unit 126 to scan a field of view, as instructed by the control unit 110.

The GUI 134 in the control unit 110 may be configured to accept entries via graphics and provide the chosen entries and less important limits to the processor 130. The speaker 136 in the control unit 110, as well as the speaker 128 in the upper obstruction detection unit 105, may be configured to provide warnings and instructions to the user as they relate to system operation and status. The microphone 138 in the control unit 110 may be configured to allow the user to enter emergency help commands, to dictate simple instructions and access and navigate the GPS 140. The alarm units 144 in the control unit 110 may be configured to activate in response to the detection of steps, an emergency event or an obstruction by providing navigational instructions.

The distance measuring unit 142 in the control unit 110 may be configured to scan a field of view as instructed by the processor 130. Based on inputs received by the transceiver 132 of the control unit 110 from transceivers 122 and 155, the transceiver 132 may transmit field of view instructions and firing angle instructions to the transceivers 122 and 155.

Figure 2:
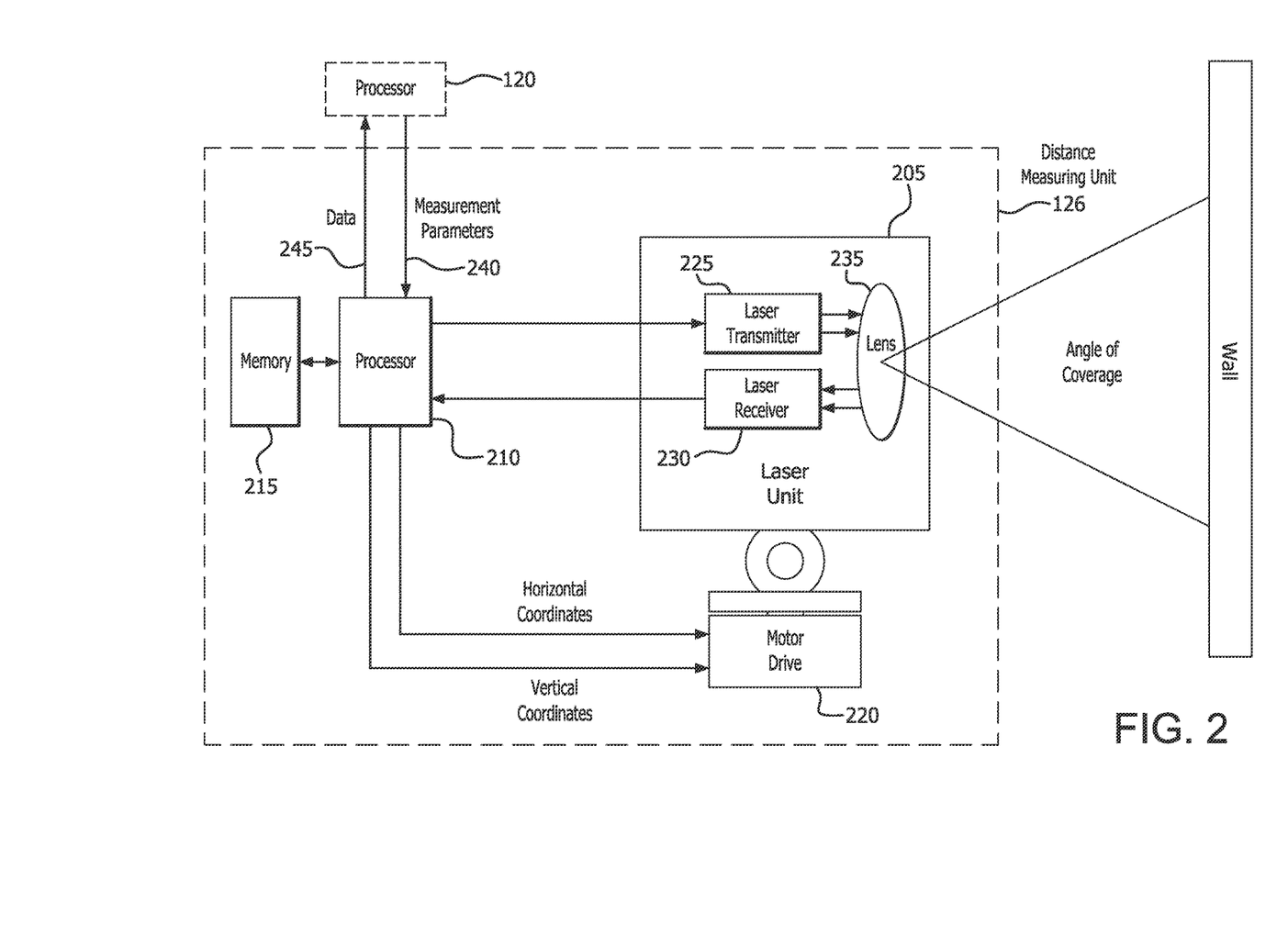
FIG. 2 is a block diagram of an example of a distance measuring unit used in the system of FIG. 1.

FIG. 2 is a block diagram of an example of a distance measuring unit 126 used in the system 100 of FIG. 1. The other distance measuring units 142 and 160 may be configured in a similar manner. The distance measuring unit 126 may include a laser unit 205, a processor 210, a memory 215 and a motor drive 220. The laser unit 205 may include a laser transmitter 225, a laser receiver 230 and a lens 235 through which the distance of an obstacle from the user, in this case a wall, is measured at various firing angles to provide the appropriate vertical and horizontal angle coverage. The processor 210 may be configured to provide horizontal and vertical coordinates to the motor drive, whereby a computer-implemented procedure may be initiated to vary the transmitting angle of the laser unit 205 and calibrate the system 100 based on the user's vertical head position. Measurements are performed by the processor 210 based on data received from the laser receiver 230 and may be selectively stored in the memory 215. The processor 210 may control the laser unit 205 based on measurement parameters 240 received from the processor 120 of the upper obstruction detection unit 105, and provide selected measurement data 245 to the processor 120.

Figure 3:
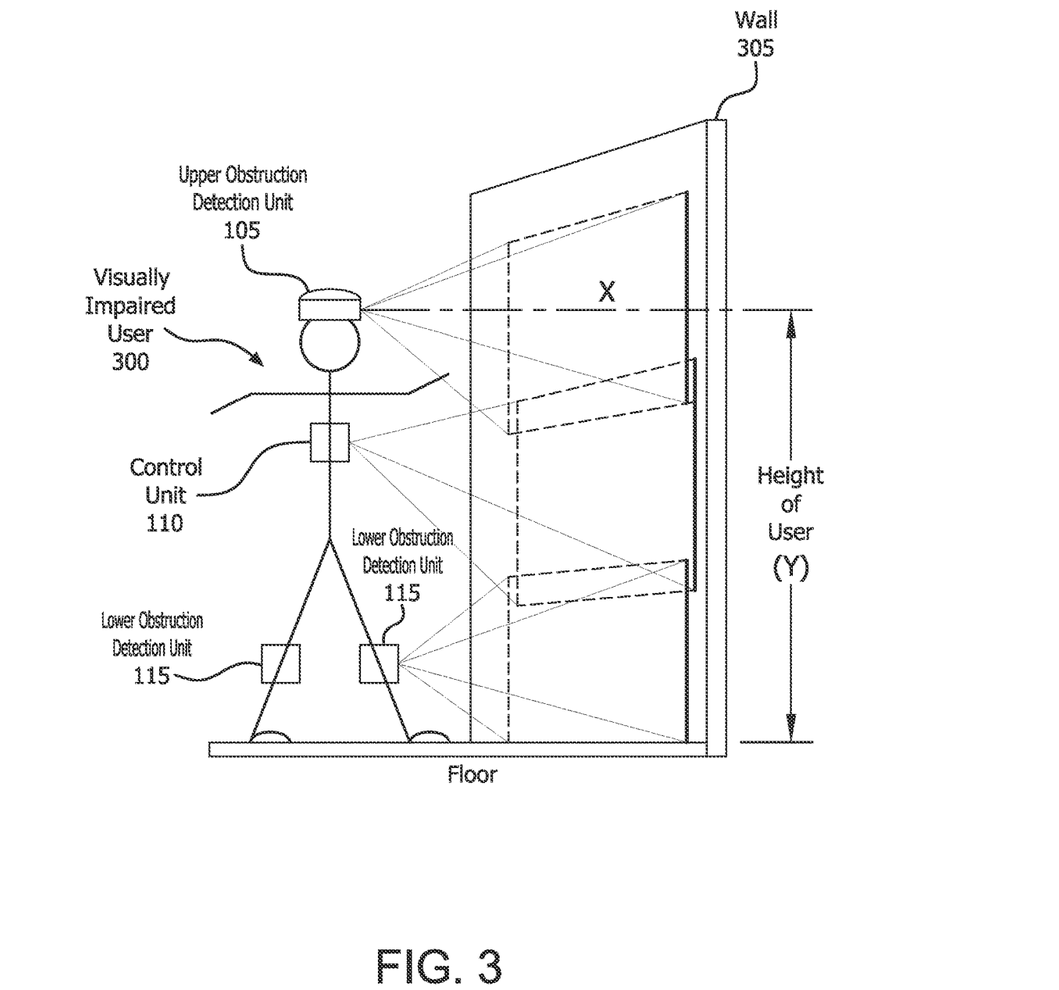
FIG. 3 shows an example of vertical and horizontal angle coverage of the system of FIG. 1.

FIG. 3 shows an example of vertical and horizontal angle coverage of the system of FIG. 1. Once the system 100 has been secured to the user's body, the user may initiate a self-calibration procedure so that the system 100 may cover ample degrees of view in both the vertical and horizontal directions. A starting point defined by horizontal and vertical coordinates for the gathering of distance measurements may be provided to the upper obstruction detection unit 105 by the control unit 110 during the procedure.

The data from the horizontal and vertical angular detection unit 124 may reflect the vertical angle of the user's head, and it may continuously be transmitted to the control unit 110 for the creation of the field of view. In addition, the upper obstruction detection unit 105 may provide the degrees of rotation that the user's head is experiencing from a zero starting point. The zero starting point may be defined as the "straight out look with no vertical head tilt."

Upon completion of all start-up procedures, each distance measuring unit 126, 142, 160 may receive instructions from the processor 130 of the control unit 110 as to their specific field of view. For example, each distance measuring unit 126, 142, 160 may be configured to cover 136 degrees in the vertical axis and 180 degrees in the horizontal axis. The utilization of these wide angles may be reflected in the collection of non-valuable data. Thus, the control unit 110 may inform each of the distance measuring units 126, 142, 160 their respective operating field of view.

The distance measuring unit 126 in the upper obstruction detection unit 105 may provide the initial horizontal and vertical settings to the control unit 110, which may then calculate the starting firing angles to all of the distance measuring units 126, 142, 160 so that the requested field of view is covered. The above procedure may be repeated every time there is a change in the user's head position.

Each of the distance measuring units 126, 142, 160 may receive inputs regarding the field of view and the incremental steps for each horizontal and vertical coordinate from the processor 130 in the control unit 110. For every field of view, and for every distance measuring unit 126, 142, 160, there may be a volume of collected data utilized to create a model outlining obstacles whose distances are less than the minimum clear distance. If any of the distance measuring units 126, 142, 160 detect an obstacle, it may be reported to the control unit 110 so that it can be tabulated and mapped so that location and distance may be immediately reported to the user. Should the distance to an obstacle be less than the safe value, the control unit 100 may activate at least one of the alarm units 144 and activate the speaker 128, 136 to inform the user regarding the detected obstacle.

Each of the distance measuring units 126, 142, 160 may report the location of the closest obstacles to the control unit 110, so that the control unit 110 may create a model including the exact locations and respective dimensions. Once all of the data has been tabulated, the control unit 110 may report the findings for that scan. If there are concerns, then the system 100 may report the alarm to the user with details regarding the location and distance to obstacle.

To construct a field of view and to detect obstacles, the distance measuring units 126, 142, 160 may be respectively located in the upper obstruction detection unit 105 fastened to the user's head, the control unit 110 fastened to the user's upper body (e.g., chest), and the lower obstruction detection unit 115 below the knee (i.e., legs). The lower obstruction detection unit 115 may be fastened to the user in such a way so that ground level obstacles and steps may easily be detected.

As each foot of the user is lifted, the system 100 may recognize that the foot is moving away from the walking surface, and during this portion of the cycle there is no need to transmit the data that reflects the lifting of the foot. Once the system 100 detects that the furthest point from the walking surface has passed, the firing angle of the distance measuring units may be changed so that the system may detect objects that are further away from the visually impaired user. It may be in this mode that early detection of holes and steps may be detected.

The distance measuring units may adjust their firing angle so that the view area is maximized by increasing the scanned area so that early detection of obstacles may allow the system 100 to make the proper correction and provide warnings so that the user's pace is not disturbed.

The alarm units 144 may be secured to the arms of the user to transfer vibrations onto the user's skin surface when an obstruction is detected, (e.g., upcoming road obstacles, a hole on the road surface, steps, and object that may affect the user within the field of view). The alarm units 144 may be individually activated to indicate to the user the side where an obstacle is located. The system 100 may have the ability to warn the user before reaching the actual obstacle to avoid the user being injured. The user may have the ability to select the frequency, amplitude, and/or length of the alarm, and the repeatability for each of the alarms if the system 100 does not sense that action has been taken to prevent an accident. The system 100 may utilize a three step warning for whenever an obstacle is detected. The system 100 may allow the user to set the distance of when the first alarm (e.g., selection of distances 5, 10 or 15 feet to an object), warning may be activated or, if not selected, the setting may be fully automatic, (distance may be relative to the walking pace). The system 100 may sound an alarm when the user's distance to an object is less than a predetermined distance, (e.g., 5 feet).

Figure 4:
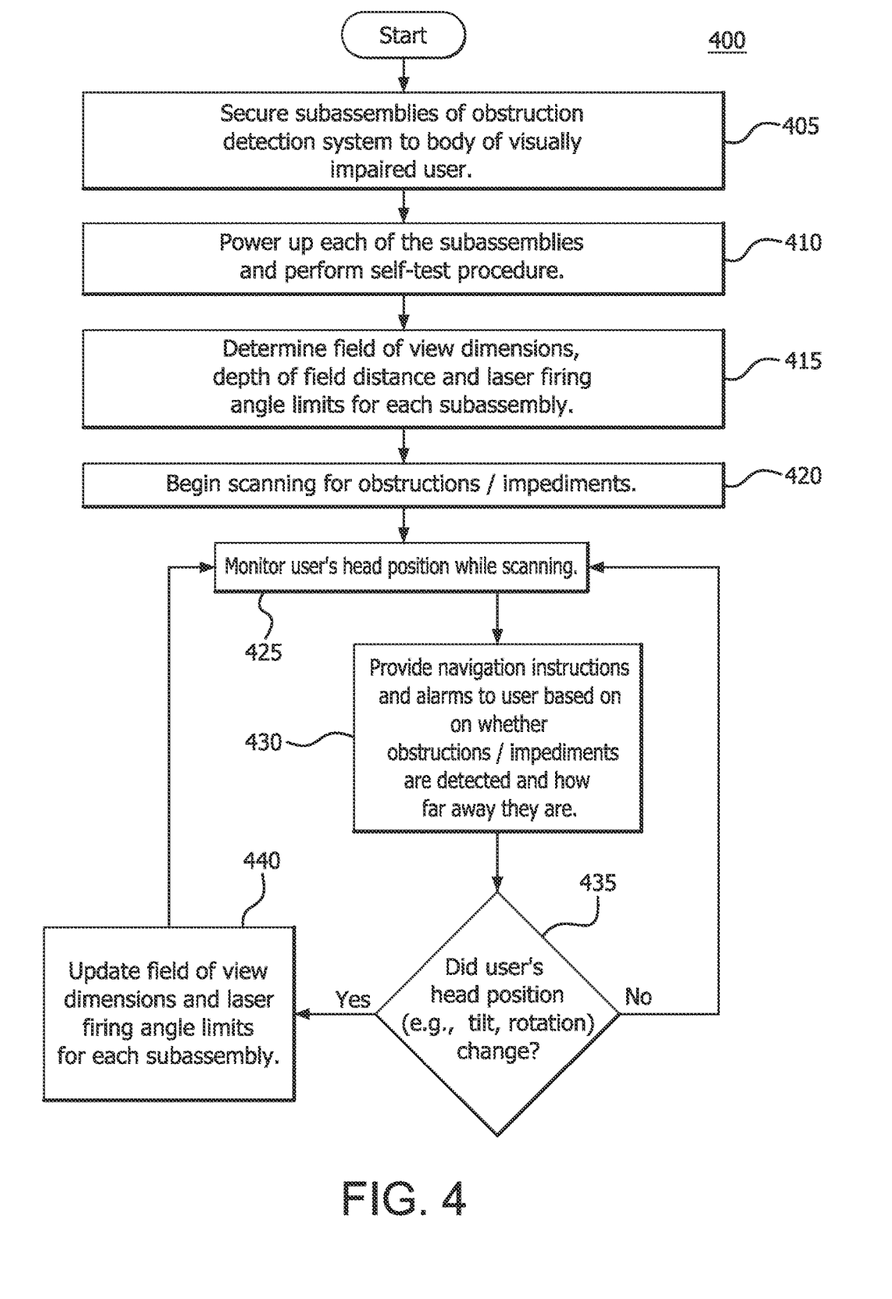
FIG. 4 is a flow diagram of a procedure used to guide and alert a visually impaired user of alert a visually impaired person of obstructions while walking.

FIG. 4 is a flow diagram of a procedure 400 used to guide and alert a visually impaired person of obstructions while walking. The subassemblies of the obstruction detection system are secured to the visually impaired user's body (405). Each of the subassemblies may be powered up and performs a self-test procedure (410). The field of view dimensions, depth of field distance and laser firing angle limits are then determined for each subassembly (415), and the system 100 begins to scan for obstacles or impediments (420). The user's head position is continuously monitored while scanning (425). Navigation instructions and alarms are provided to the user based on whether obstructions or impediments are detected and how far away they are (430). On a condition that the user's head position (e.g., tilt, rotation) changes (435), the field of view dimensions and laser firing angle limits are updated for each subassembly (440), and then the procedure 400 returns to monitoring the user's head position (425).

The communication between the control unit 110, the upper obstruction detection unit 105 and the lower obstruction detection units 115 of system 100 may communicate via the Bluetooth technology. Bluetooth radio frequencies may include the band of 2400.0 MHz-2483.5 MHz.

Adaptive scanning may be implemented in the system 100 such that that as the first steps by the user are taken, the system 100 may scan at a faster rate so that all of the fields may be updated. The field scanning rate may be directly related to the rate of motion of the visually impaired user. After each distance measuring unit completes a line of scanning, the system 100 may automatically adjust the setting of the firing angle for the laser light so that the new line may be scanned. This procedure may continue until the complete defined field is scanned. Each of the distance measuring units may operate as a standalone unit. However, the inputs for the field to be scanned may be provided by the control unit 110. At the end of every scanned field, each distance measuring unit may provide data containing reflected distance measurements.

Since the system 100 may have defined the depth of the field, any measured distance greater than the minimum required may be discarded. Once a full field has been scanned, the data may be transmitted to the control unit 110 where it may be processed. If any violations are present, the generating of alarms may be executed. Once an alarm command is released, the received data may be cleared and deleted. Thus, data from each distance measuring unit may be processed as it is received in order to determine the presence of obstacles.

The system 100 may create contour lines, (e.g., by sequentially connecting equal distance points utilizing a systematic as defined by each distance measured coordinate), thus outlining the physical size of the object. The utilization of the collected data may allow the control unit 110 to create an image similar to a topographical map and simultaneously check if any of the measurements have violated the minimum clear distance dimension. The outline of the detected obstacles and respective location may be informed to the visually impaired. Once an obstacle size and location has been detected the system can re-adjust the field of view so that a collision is prevented, while pace and stride is maintained.

Once the field of view is created, any received data that is associated with distances greater than the minimum defined depth of field may be discarded. After each field of view data has been received by the distance measuring unit and violations have been annunciated, the data may be discarded after the field of view status for each distance measuring unit has been completed.

Each distance measuring unit may process the collected data (look for measurements violations) and report the finding to the control unit 110. The control unit 110 may generate an alarm if obstacles have violated the minimum distance limit.

After each distance measuring unit completes the field of view scanning, the system may refresh the starting scanning angles for all distance measuring units, in addition the field of view may also be receptive to changes as requested by the visually impaired. Each of the obstruction detection units 105, 110 and 115 may have computing capabilities so that each may determine the location and size of the upcoming obstruction. The system 100 may start scanning at the upper left hand corner and end at the bottom right hand corner of the outlined field of view. The transmitted data from each of the units 105 and 115 may be in the form of STUVWXYZ, where S=Device Identification, XXXYY; T=Start Firing angle X direction, degrees; U=End Firing angle X direction, degrees; V=Start Firing angle Y direction, degrees; W=End Firing angle Y direction, degrees; X=Firing angle step in X direction, degrees; Y=Firing angle step in Y direction, degrees; and Z=Measured distance, inches.

For example, a data transmit structure for one distance measured reading may be: XXXYY, 2, 110, 20, 75, 1, 1, 110, where the first measured data point for this scan may indicate the following:

S=Device Identification, XXXYY;
T=Start Firing angle X direction, degrees . . . 2;
U=End Firing angle X direction, degrees . . . 110;
V=Start Firing angle Y direction, degrees . . . 20;
W=End Firing angle Y direction, degrees . . . 75;
X=Firing angle step in X direction, degrees . . . 1;
Y=Firing angle step in Y direction, degrees . . . 1; and
Z=Measured distance, inches . . . 110.

The total number of data points for the above field of $(U-T) \times (W-V) = 108 \times 55 = 5940$.

Each of the sub-assemblies required for the overall operation of the system may contain device identification (ID). The ID may be utilized to confirm operation and presence within the control unit network. The ID may be automatically assigned by the control unit 110 every time a new assembly is added for the detection of obstacles. The structure of the ID may be part letters and part numbers as follows: Device Identification=XXXYY, where XXX may be letters from A to Z and YY may be digits from 1 to 99. It should be noted that other identification schemes may be used without departing from the general features described above.

The control unit 110 may receive inputs from the upper obstruction detection unit and calculate the total field of view dimensions and each of the distance measuring units' field of view dimensions. The field of view may take into account the user's physical size and may additionally allow area for a guard band.

A system starting point may be that of a vertical distance of 8.5 feet and a horizontal distance of 10 feet, which is a total of 85 square feet. The field of view for each distance measuring unit may be determined by the control unit 110. The control unit 110 may determine the depth of field, whereby any measured data that is less than the selected distance field may be retained while any measured distance that is greater may be discarded. The control unit 110 may calculate the depth of the field based on the square footage of the view. For example, if the system is monitoring an area of 8.5 feet high and 10 feet wide, any measured distance that is greater 20 feet may not be retained.

The firing angle for each of the distance measuring devices may be dictated by the control unit 110. The firing angle may be based on the tilt and the rotation of the user's head. The information may be sent to the control unit 110 for calculating the details for each of the distance measuring devices so that full coverage of the field of view is achieved. The control unit 110 may provide the following to each of the distance measuring devices:

S=Device Identification, XXXYY;
T=Start Firing angle X direction, degrees;
U=End Firing angle X direction, degrees;
V=Start Firing angle Y direction, degrees;
W=End Firing angle Y direction, degrees;
X=Firing angle step in X direction, degrees;
Y=Firing angle step in Y direction, degrees; and
Z=Measured distance, inches.

If requested or required, the system 100 may increase or decrease the step size between firing angles in order to increase or decrease the resolution of the field of view.

Once all of the subassemblies of the system 100 have been secured on the visually impaired user, a power command may be sent by the user when depressing a start button on the control unit 110, which in turn may issue a power up command to the remaining subassemblies (i.e., the upper obstruction detection unit 105 and the lower obstruction detection units 115). Each of the subassemblies may have an ID, thus assuring that only the control unit 110 may be allowed to communicate with the subassemblies. Assurance of a successful powering sequence by each of the subassemblies may be sent to the control unit 110. During the power up sequence, the control unit 100 may collect data from each associated device as it relates to battery status, (e.g., amount of battery power remaining).

After assuring that all subassemblies are secured, the control unit 110 may poll all of the subassemblies and confirm that radio frequency (RF) communication and data transfer is properly working between any subassembly and the control unit 110. The control unit 110 may send commands to all of the subassemblies instructing them to confirm the scanning area. Upon receiving data, each distance measuring unit may be evaluated for targeted versus actual view, and if the actual view is not within the targeted range, the control unit 110 may be reset and the start-up operations may have to be re-run. The control unit 110 may instruct the user to adjust the upper obstruction detection unit so that operability throughout the selected area dimensions is possible. The alarm units 144 may be activated to confirm functionality.

After the power up sequence has been completed, the control unit 110 may initiate a system initialization routine for each subassembly. Upon confirmation that each associated subassembly is powered and communicating, the control unit 110 may issue a self-calibrate command (e.g., establish height of user, numbering of distance measuring devices, alarm distance, and field of view). Once all of the subassemblies have been secured, they may be polled and each may be automatically identified. The control unit 110 may communicate with each of the subassemblies secured to the visually impaired user so that data communication, battery status, unit location, and unit orientation are reported to the control unit 110. In addition, alarm warning limits may be entered into the system during the initialization process.

As part of the initialization, the user may select the preference of the operation. The user may select either an automatic or user defined mode to define and monitor the field of view. The control unit 110 may request that the maximum operational distance from the user be selected, which may allow the system to discard any distance readings greater than those selected. Once the user selects the operational distance, the control unit 110 may monitor the upper obstruction detection unit so that it may globally send the coordinates to the remaining distance measuring units for the starting scanning angle.

After all of the subassemblies of system 100 have been secured to the user, the control unit 110 may instruct the user to face a wall and stay back at least 6 feet away from the wall. Once the user has moved back to a minimum of 6 feet away from the wall, instructions may be provided by the control unit 110 for all of the distance measuring units 126, 142 and 160 to provide a distance reading (where the coordinate for each unit may be 0,0). The user may be instructed to stand upright, keep his or her head level and face straight ahead to the wall, while each of the distance measurement units 126, 142 and 160 take measurements. Once all of the measurements have been received, the control unit 110 may determine whether all of the subassemblies have been correctly mounted by checking whether the measurements performed by the subassemblies are within a selected accuracy tolerance. The user may be asked to enter the unit of measurement for the reporting of data, (e.g., feet or meters).

After all of the subassemblies of system 100 have powered up, each may go through a self-calibration cycle. During this calibration cycle, each subassembly may be tested for functionality, two way radio frequency (RF) transmission, battery status, and generating alarms. Once the self-calibration cycle has been completed, the user may be asked to position his or her body at some known distance from a wall. Once the user is facing a wall, all of the distance measuring devices may go through a sequence of measurements for assuring that the user's distance from the wall is confirmed from multiple devices. During this stage, Pythagorean calculations may be performed to assure the correct positioning of the distance measuring devices on the user.

The system 100 may utilize Pythagorean calculations in order to detect: distance to obstruction, height of the obstruction, height of the step, distance to a step, which foot may have to step down or step up and whether steps are going up or down. As a result of this calibration, the field of view may be determined, which may take into consideration: head position, user height, extension of arms, spreading of arms and feet. The user may be instructed so that each step can be correctly completed. While in a standing position, the control unit 110 may calculate and inform the appropriate field of view to each of the distance measuring units.

Alarm detection and informing may be exercised while acknowledgement from the user may be confirmed. Once the system 100 determines the height of the visually impaired user through the usage of tables and Pythagorean calculations, the system 100 may establish the total height and width limits for the field of view. The firing angles for the distance measuring units may cover an area that exceeds the user's total body size with extended limbs. The system 100 may calculate the firing angles for all distance measuring devices for both vertical and horizontal positions, as dictated by the head movement.

Since the system may utilize multiple distance measuring units, the total field of view may be divided amongst them as determined by the control unit 110. The system 100 may calculate and inform the firing angle to every distance measuring unit every time the system 100 is started, or anytime the user's head position has changed from the previous scan. The scanning direction may be controlled from left to right or right to left. After each horizontal scan, the system 100 may automatically increase or decrease the vertical firing angle until it has completed the requested field of view. Should the user move his or her head, the system 100 may recognize the new head position and make all of the required corrections and calculations so that the new field of view reflects the horizontal and vertical position of the user's head. For the distance measuring units 160 in the units 115 secured on the user's legs, the system may split the coverage for each device so that each one of them may cover half of their field of view.

The system 100 may be able to interpret data received from the leg mounted subassemblies 115 to determine at what distance is a step away from the user. When the system 100 determines that the received data has a specific pattern, it may start constructing models and may determine that a step pattern is present. The system 100 may decipher the collected data and determine the height of the rise and the length of the run of a step.

As the user's foot gets closer to the step, the distance measuring devices 160 may detect the drastic changes in the measured distance data. Distance data measurements (when a foot is on the ground) may show that the distance to a step may drastically change whenever the user goes through a 90 degree angle. The drastic changes may determine whether there is a transition from riser to run, or run to riser. Once the presence of a step is determined, the system 100 may inform the user as to which leg needs to be lifted first (the instructions may be provided via audio or via the alarm coupling mechanism). Once a foot has been planted on the run of a step, the monitoring of distances by the system may automatically guide and inform the user as to what needs to be done so that the two feet are resting on the same step.

The system 100 may run in either an automatic mode or a manual mode. The complexity of the system 100 cannot rely on the entering of coordinates as steps are taken, or the constantly changing field of view. The inputs of coordinates and settings may be difficult for the continuous operation of the product if manual mode were to be selected thus it is recommended that the operation of the unit be automatic.

The detection of obstacles in the path of a visually impaired requires that the system is fully operational and that the functionality of limit settings be determined as a function of user physical size rather than user direct entry. When in automatic mode, the system 100 may construct the field of view by determining the physical dimensions of the visually impaired plus an additional area for an added guard band.

In order to minimize user intervention, the system may operate in automatic mode. Upon completion of securing the devices to the user and having confirmed that all of the subsystem operations are faultless, the control unit 110 may inform the user that the running of the system 100 is automatic (i.e., there are no direct entries that need to be made as the user gets ready to take the first step).

The start scanning command for all of the distance measuring devices may be controlled by the user's head position. The system 100 may execute and update as steps are taken by the user, thus minimizing user interactions as the user moves. The control unit 110 may constantly update the field of view as it receives inputs from all of the distance measuring units in system 100, and correctly informs the user of upcoming obstacles and their respective locations. The configuration of the field of view is fully automatic, and it is the user's head position that triggers the construction of the field of view before the firing angle for all of the distance measuring devices is determined. Whenever the system 100 is running on automatic mode, the scanning of the field of view may start as soon as the user lifts a foot.

Once the field of view is created, the control unit 100 may inform each of the distance measuring units of their respective field of view. Once the distance measuring units receive the field of view updates from the control unit 110, each distance measuring unit may complete the present scanning cycle and update the scanning tables to reflect the latest inputs before new distance measuring cycle is started.

The system may require some manual entries initiated by the user. The user may be asked to power the control unit 110 and, in addition, confirm that correct steps are taken as the system 100 is being calibrated. Manual entries may be required, but their number may be kept at a minimum.

The user may be able to choose the method by which alarms may be informed. Alarms may be coupled to the user utilizing audio tones and vibration pulses. The system 100 may generate warnings when: minimum clear distance, distance to obstruction, height of the obstruction, height of the step and distance to the step are detected. In addition, the control unit 110 may provide instructions utilizing the alarm coupling mechanism, (e.g., direction, determine which foot may have to step down or step up, or the ability to determine whether steps are going up or down).

In one embodiment, a computer-implemented method of guiding a visually impaired user of a navigation system may be implemented to avoid obstructions and impediments while walking. The user may wear a plurality of subassemblies of the system anywhere on his or her body. For example, the subassemblies may be incorporated into one or more of a shoe, eyewear (goggles, glasses), a hat, a helmet, a watch, a smart phone, and the like. The tilt and rotation of the user's head may be monitored using one of the subassemblies worn on the user's head. Based at least in part on the tilt and rotation of the user's head, vertical and horizontal firing angles used by a distance measuring unit in each of the subassemblies may be calculated to transmit and receive laser signals to perform measurements. Navigation instructions and alarms may be provided to the user based on whether an obstruction or an impediment is detected that is closer than a predetermined distance to the user while the user is walking based on the measurements.

Field of view dimensions, depth of field distance and laser firing angle limits may be determined for each of the distance measuring units. An initialization procedure may be performed by instructing the user to change physical position with respect to the user's distance from a wall and the user's head position, while each of the distance measuring units transmits and receives laser signals at different vertical and horizontal firing angles to perform measurements.

One of the subassemblies may serve as a control unit 110 that is worn on the user's chest and communicates with all of the other subassemblies. The control unit 110 may calculate a total field of view to be scanned based on data provided by the subassembly worn on the user's head. The control unit 110 may calculate the field of view dimensions for each of the distance measuring units. A horizontal and vertical angular detection unit located in the subassembly worn on the user's head may be used to determine tilt and rotation of the user's head. The control unit 110 may calculate the vertical and horizontal start firing angles based on the tilt and rotation of the user's head. One of the subassemblies may be worn on the user's left leg and another one of the subassemblies is worn on the user's right leg. As understood by one of ordinary skill in the art, additional subassemblies may be added to cover the sides and/or the rear of the user at various distances above ground level. Alternatively, the subassemblies may be configured to provide 360 degree coverage.

In another embodiment, a computer-implemented method of guiding a visually impaired user of a navigation system may be implemented to avoid obstructions and impediments while walking. The user may wear a plurality of subassemblies of the system. Field of view dimensions, depth of field distance and laser firing angle limits may be determined for a distance measuring unit in each of the subassemblies. Each of the distance measuring units may transmit and receive laser signals at different vertical and horizontal firing angles to perform measurements. Navigation instructions and alarms may be provided to the user based on whether an obstruction or an impediment is detected that is closer than a predetermined distance to the user while the user is walking based on the measurements.

In another embodiment, a navigation system may include a plurality of subassemblies worn by a visually impaired user to avoid obstructions and impediments while walking. Each of the subassemblies may comprise a distance measuring unit comprising a laser unit configured to transmit and receive laser signals to perform measurements. A control unit may be configured to communicate with each of the subassemblies and provide navigation instructions and alarms to the user based on whether an obstruction or an impediment is detected that is closer than a predetermined distance to the user while the user is walking based on the measurements.

In another embodiment, a non-transitory computer-readable storage medium may contain a set of instructions for assisting a visually impaired user to navigate around obstacles and impediments while walking. At least one of the instructions may be used for calculating, based at least in part on tilt and rotation of a user's head, vertical and horizontal start firing angles used by a plurality of distance measuring units to transmit and receive laser signals to perform measurements. At least another one of the instructions may be used for providing navigation instructions and alarms to the user based on whether an obstruction or an impediment is detected that is closer than a predetermined distance to the user while the user is walking based on the measurements.

What is claimed is:

1. A computer-implemented method of guiding a visually impaired user of a navigation system to avoid obstructions and impediments while walking, the user wearing a plurality of subassemblies of the system, the method comprising:
    monitoring tilt and rotation of the user's head using one of the subassemblies worn on the user's head;
    calculating, based at least in part on the tilt and rotation of the user's head, vertical and horizontal firing angles used by a distance measuring unit in each of the subassemblies to transmit and receive laser signals to perform measurements; and
    providing navigation instructions and alarms to the user based on whether an obstruction or an impediment is detected that is closer than a predetermined distance to the user while the user is walking based on the measurements.

2. The computer-implemented method of claim 1 further comprising:
    determining field of view dimensions, depth of field distance and laser firing angle limits for each of the distance measuring units.

3. The computer-implemented method of claim 1 further comprising:
    performing an initialization procedure by instructing the user to change physical position with respect to the user's distance from a wall and the user's head position, while each of the distance measuring units transmits and receives laser signals at different vertical and horizontal firing angles to perform measurements.

4. The computer-implemented method of claim 1 wherein one of the subassemblies serves as a control unit that is worn on the user's chest and communicates with all of the other subassemblies.

5. The computer-implemented method of claim 4 further comprising:
    the control unit calculating a total field of view to be scanned based on data provided by the subassembly worn on the user's head; and
    the control unit calculating the field of view dimensions for each of the distance measuring units.

6. The computer-implemented method of claim 5 further comprising:
    using a horizontal and vertical angular detection unit located in the subassembly worn on the user's head to determine tilt and rotation of the user's head.

7. The computer-implemented method of claim 4 further comprising:
    the control unit calculating vertical and horizontal start firing angles based on the tilt and rotation of the user's head.

8. The computer-implemented method of claim 1 wherein one of the subassemblies is worn on the user's left leg and another one of the subassemblies is worn on the user's right leg.

9. A computer-implemented method of guiding a visually impaired user of a navigation system to avoid obstructions and impediments while walking, the user wearing a plurality of subassemblies of the system, the method comprising:
    determining field of view dimensions, depth of field distance and laser firing angle limits for a distance measuring unit in each of the subassemblies, wherein each of the distance measuring units transmits and receives laser signals at different vertical and horizontal firing angles to perform measurements; and
    providing navigation instructions and alarms to the user based on whether an obstruction or an impediment is detected that is closer than a predetermined distance to the user while the user is walking based on the measurements.

10. The computer-implemented method of claim 9 further comprising:
    monitoring tilt and rotation of the user's head using one of the subassemblies worn on the user's head; and
    calculating, based at least in part on the tilt and rotation of the user's head, vertical and horizontal firing angles used by the distance measuring units to transmit and receive laser signals to perform measurements.

11. The computer-implemented method of claim 10 further comprising:
    using a horizontal and vertical angular detection unit located in the subassembly worn on the user's head to determine tilt and rotation of the user's head.

12. The computer-implemented method of claim 9 wherein one of the subassemblies serves as a control unit that is worn on the user's chest and communicates with all of the other subassemblies.

13. The computer-implemented method of claim 12 further comprising:
    the control unit calculating a total field of view to be scanned based on data provided by the subassembly worn on the user's head; and
    the control unit calculating the field of view for each of the distance measuring units.

14. The computer-implemented method of claim 12 further comprising:
    the control unit calculating the vertical and horizontal start firing angles based on the tilt and rotation of the user's head.

15. The computer-implemented method of claim 9 wherein one of the subassemblies is worn on the user's left leg and another one of the subassemblies is worn on the user's right leg.

16. A navigation system comprising:
    a plurality of subassemblies worn by a visually impaired user to avoid obstructions and impediments while walking, wherein each of the subassemblies comprises a distance measuring unit comprising a laser unit configured to transmit and receive laser signals to perform measurements; and a control unit configured to communicate with each of the subassemblies and provide navigation instructions and alarms to the user based on whether an obstruction or an impediment is detected that is closer than a predetermined distance to the user while the user is walking based on the measurements, wherein a first one of the subassemblies is configured to be worn on the user's head to monitor tilt and rotation of the user's head, and the control unit is further configured to calculate, based at least in part on the tilt and rotation of the user's head, vertical and horizontal start firing angles used by a distance measuring unit in each of the subassemblies to transmit and receive laser signals to perform measurements.

17. The navigation system of claim 16 wherein the control unit includes a laser unit configured to transmit and receive laser signals to perform measurements.

18. The navigation system of claim 16 wherein a second one of the subassemblies is configured to be worn on one of the user's legs.

19. A non-transitory computer-readable storage medium containing a set of instructions for assisting a visually impaired user to navigate around obstacles and impediments while walking, a least one of the instructions for calculating, based at least in part on tilt and rotation of a user's head, vertical and horizontal start firing angles used by a plurality of distance measuring units to transmit and receive laser signals to perform measurements, and at least another one of the instructions for providing navigation instructions and alarms to the user based on whether an obstruction or an impediment is detected that is closer than a predetermined distance to the user while the user is walking based on the measurements.

* * * * *